United States Patent
Mauerer

(10) Patent No.: US 10,140,097 B2
(45) Date of Patent: Nov. 27, 2018

(54) SYSTEM FOR IMPROVED PARALLELIZATION OF PROGRAM CODE

(71) Applicant: Siemens Aktiengesellschaft, Munich (DE)

(72) Inventor: Wolfgang Mauerer, Donaustauf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 43 days.

(21) Appl. No.: 15/322,052

(22) PCT Filed: Apr. 2, 2015

(86) PCT No.: PCT/EP2015/057313
§ 371 (c)(1),
(2) Date: Dec. 23, 2016

(87) PCT Pub. No.: WO2015/197210
PCT Pub. Date: Dec. 30, 2015

(65) Prior Publication Data
US 2017/0147292 A1 May 25, 2017

(30) Foreign Application Priority Data
Jun. 27, 2014 (DE) .................. 10 2014 212 437

(51) Int. Cl.
*G06F 9/44* (2018.01)
*G06F 8/33* (2018.01)
*G06F 8/41* (2018.01)

(52) U.S. Cl.
CPC . *G06F 8/33* (2013.01); *G06F 8/42* (2013.01)

(58) Field of Classification Search
CPC .... G06F 17/30327; G06F 21/563; G06F 8/33; G06F 8/42; G06F 8/427
USPC ........................................................ 717/119
See application file for complete search history.

(56) References Cited

U.S. PATENT DOCUMENTS

| 5,802,375 | A | 9/1998 | Ngo et al. ..................... 717/160 |
| 6,106,575 | A * | 8/2000 | Hardwick ................ G06F 8/45 712/229 |
| 6,212,617 | B1 * | 4/2001 | Hardwick ............... G06F 8/457 345/505 |

(Continued)

FOREIGN PATENT DOCUMENTS

WO 2015/197210 A1 12/2015 ............... G06F 9/44

OTHER PUBLICATIONS

Yamaguchi, Fabian et al., "Modeling and Discovering Vulnerabilities with Code Property Graphs," IEEE Symposium on Security and Privacy, pp. 590-604 (15 pages), 2014.

(Continued)

*Primary Examiner* — Marina Lee
(74) *Attorney, Agent, or Firm* — Slayden Grubert Beard PLLC

(57) ABSTRACT

A system is provided in which a human annotation, undertaken for direct implementation of parallelization measures, is used for training an adaptive automatic classification method, which is then applied automatically to code blocks to be analyzed, wherein further suitable patterns obtained by human review from the automatically analyzed code blocks may then be used in turn for continuous improvement of the adaptive automatic classification method.

9 Claims, 2 Drawing Sheets

(56) References Cited

U.S. PATENT DOCUMENTS

| | | | | |
|---|---|---|---|---|
| 6,243,863 B1* | 6/2001 | Kothari | ............... | G06F 8/456 |
| | | | | 717/144 |
| 7,047,232 B1* | 5/2006 | Serrano | ............... | G06F 8/456 |
| 7,174,536 B1* | 2/2007 | Kothari | ............... | G06F 11/3664 |
| | | | | 717/105 |
| 9,189,217 B2* | 11/2015 | Von Platen | ............... | G06F 8/452 |
| 9,223,554 B1* | 12/2015 | Lawson | ............... | G06F 8/53 |
| 2005/0188364 A1 | 8/2005 | Cockx et al. | ............... | 717/159 |
| 2010/0153933 A1* | 6/2010 | Bohlmann | ............... | G06F 8/43 |
| | | | | 717/144 |
| 2010/0306750 A1* | 12/2010 | Helovuo | ............... | G06F 8/456 |
| | | | | 717/143 |
| 2013/0074037 A1 | 3/2013 | Lavallee et al. | ............... | 717/116 |
| 2013/0275955 A1 | 10/2013 | Agarwal et al. | ............... | 717/163 |
| 2014/0019949 A1 | 1/2014 | Craymer | ............... | 717/150 |
| 2014/0237459 A1 | 8/2014 | Von Platen et al. | ............... | 717/155 |
| 2017/0147292 A1* | 5/2017 | Mauerer | ............... | G06F 8/33 |

OTHER PUBLICATIONS

German Office Action, Application No. 102014212437.9, 7 pages, dated Mar. 30, 2015.
International Search Report and Written Opinion, Application No. PCT/EP2015/057313, 14 pages, dated Aug. 31, 2015.

\* cited by examiner

SYSTEM FOR IMPROVED PARALLELIZATION OF PROGRAM CODE

CROSS-REFERENCE TO RELATED APPLICATIONS

This application is a U.S. National Stage Application of International Application No. PCT/EP2015/057313 filed Apr. 2, 2015, which designates the United States of America, and claims priority to DE Application No. 10 2014 212 437.9 filed Jun. 27, 2014, the contents of which are hereby incorporated by reference in their entirety.

TECHNICAL FIELD

The invention relates to a system in which parallel software is obtained from existing non-parallel software in a fully automated or partially automated manner.

BACKGROUND

Parallel software could previously be obtained from existing non-parallel software in a fully automatic manner only in rare cases, for example in the case of simple sequences.

In contrast, more complex algorithms could previously be changed to a parallel form only by means of manual rewriting or by means of time-consuming and cost-intensive manual conversion.

SUMMARY

One embodiment provides a system for improved parallelization of program code, in which, starting from source code which is present both in a serial variant and in a parallel variant, code blocks which provide functionally identical results but each come from the two different variants are identified, in which both variants are each transferred to a language-independent, abstract syntactic form and the abstracted functionally identical blocks are stored together in a respective pattern in a semantic pattern database, in which a manual classification according to categories selected by experts or an automatic classification based on mapping to these categories selected by experts, as determined by means of machine learning, is carried out for a respective pattern, and in which a respective new code block to be investigated is then likewise transferred to the abstract syntactic form and is compared with the abstracted serial data blocks of all patterns in the semantic pattern database, and a category best matching the new code block is automatically selected in this manner from the categories selected by experts.

In one embodiment, the categories selected by experts contain the categories "rewrite loops", "change data structures" and "double structures".

In one embodiment, the mapping is determined by means of machine learning with the aid of a neural network or a random forest.

In one embodiment, an end user with the matching category then selects at least one matching pattern for parallelization.

In one embodiment, graph comparison is used to select a best matching pattern in such a manner that the serial code of the pattern is closest to the code to be parallelized in the sense of a graph distance, in which the structural elements of both graphs are then aligned, and a graph transformation is created for the graph of the best matching pattern and its parallel version, and in which the resulting graph transformation is applied to the graph being investigated, and a matching parallel version is generated thereby.

BRIEF DESCRIPTION OF THE DRAWINGS

Example aspects and embodiments of the invention are explained in more detail below using with reference to the drawing, in which.

DETAILED DESCRIPTION

Some embodiments provide a system for improved parallelization of program code, in which the above-mentioned disadvantages are reduced or eliminated and further automation is enabled.

Some embodiment provide a system in which a human annotation made for the purpose of directly implementing parallelization measures is used to train an adaptive automatic classification method which is then applied to code blocks to be automatically analyzed, further suitable patterns then obtained from the automatically analyzed code blocks by means of human review in turn being used to continuously improve the adaptive automatic classification method.

Figure 1:
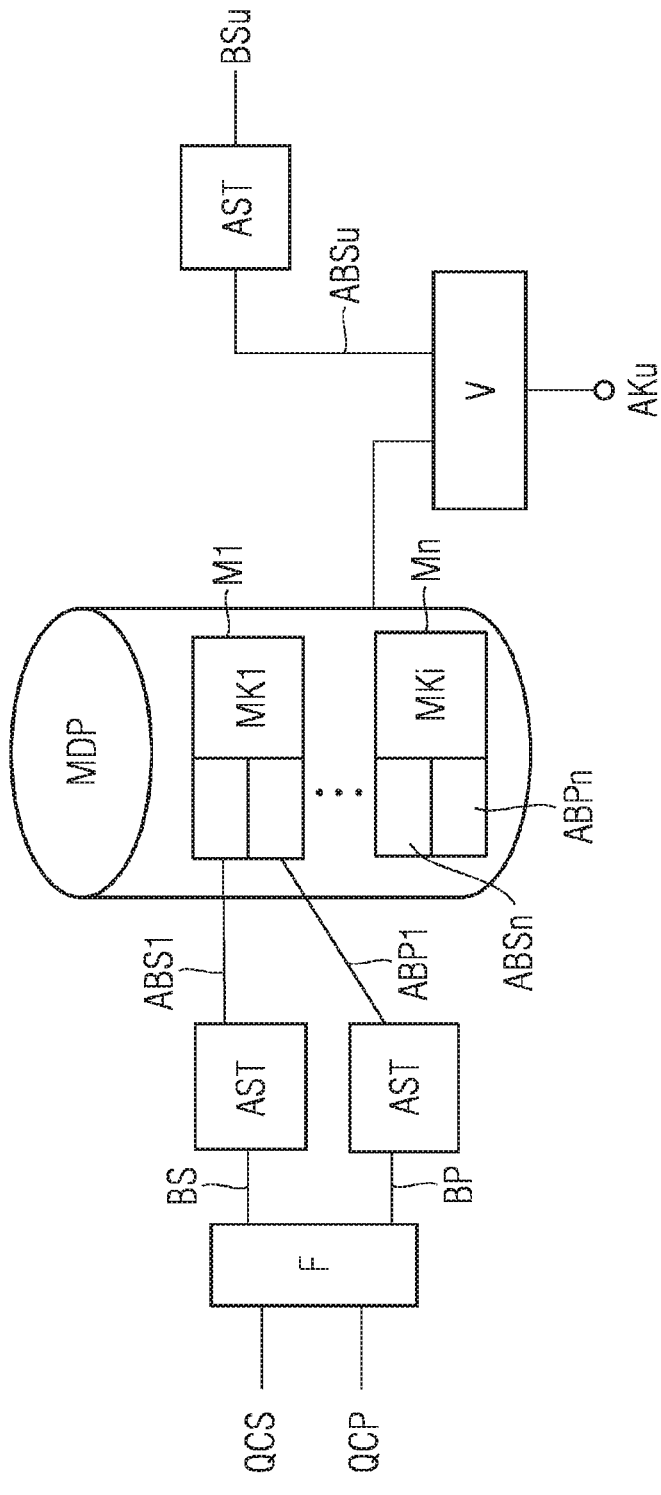
FIG. 1 shows an example process flow for parallelization of program code, according to an example embodiment.

FIG. 1 shows an example process flow for parallelization of program code, according to an example embodiment. The process may be performed by one or more computer processors executing software or other computer instructions stored in non-transitory computer-readable media. As shown in FIG. 1, starting from source code which is present in serial and parallel variants QCS and QCP, a checking unit F identifies code blocks BS and BP which provide functionally identical results but come from the different variants QCS and QCP.

Furthermore, both variants are each transferred to a language-independent, abstract syntactic form AST and the abstracted functionally identical blocks, for example ABS1 and ABP1, are stored together in a pattern M1 in a semantic pattern database MDP which overall has corresponding patterns M1 . . . Mn with corresponding abstracted code block pairs ABS1, ABP1 . . . ABSn, ABPn.

The n patterns M1 . . . Mn are then assigned to i related categories MK1 . . . MKi, for example "rewrite loops", "change data structures" and "double structures", by means of respective manual classification, that is to say expert-based evaluation and classification, in order to obtain parallelization schemes.

Conventional methods of machine learning, for example neural networks and random forests, are then used to make the mapping to the categories selected by experts accessible in an automated manner.

If one or more classification methods are trained with a sufficiently large amount of data, new unknown code blocks or code pieces BSu can be transferred to the abstract syntactic form AST described in order to be assigned to a category AKu by means of automatic classification.

The category AKu can optionally be made available to an end user who then selects the best matching pattern for parallelization.

Figure 2:
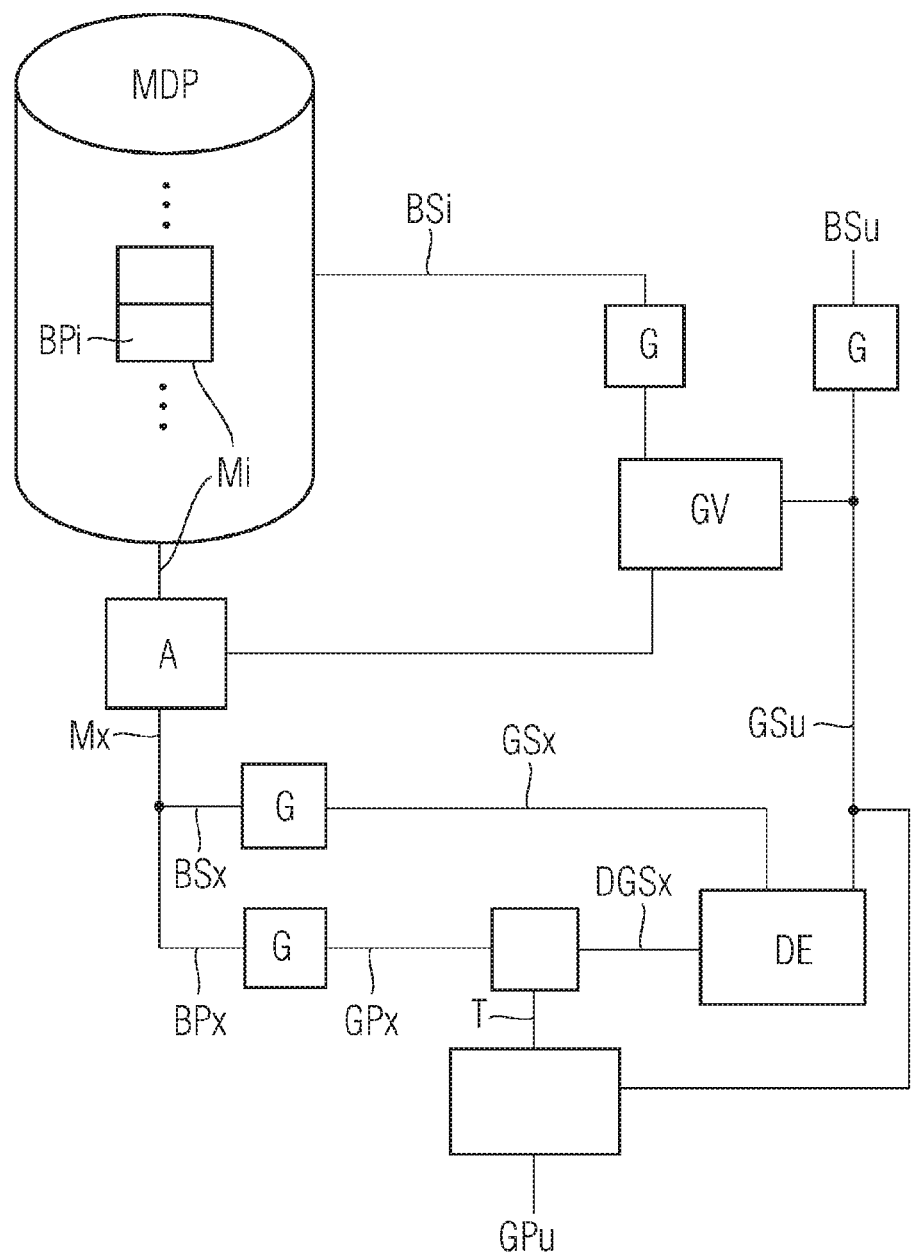
FIG. 2 shows an example process flow for a specific implementation for parallelization, according to an example embodiment.

An additional part of the system according to the invention, which is illustrated in FIG. 2, can be optionally used to determine not only the respective category AKu of the code piece respectively being investigated but to present a specific proposal for parallelization. Like the process shown in FIG. 1, the process shown in FIG. 2 may be performed by one or more computer processors executing software or other computer instructions stored in non-transitory computer-readable media. Graph comparison GV techniques are used to select A that pattern Mx, with its serial code BSx, which is closest to the code BSu to be parallelized in the sense of a graph distance. The structural elements of both graphs are then aligned DE, a graph transformation T is created for the pattern graph DGSx and its parallel version GPx, and the resulting graph transformation T is applied to the graph GSu being investigated and a matching parallel version GPu is produced thereby.

Alternatively, another operating mode applies the same similarity search of the above-described second part of the system according to the invention not only to a particular code point but to a larger amount of source text. Furthermore, the similarity search is not used as the starting point for a graph transformation in this case, but rather is used to identify points of maximum similarity to existing patterns and to thereby mark the portions of a code which can be parallelized most easily.

What is claimed is:

1. A method for parallelization of program code, the method comprising:
   analyzing source code having both a serial variant and a parallel variant defining two different variants of the source code to identify pairs of corresponding code blocks that provide functionally identical results but come from the two different variants,
   for each identified pair of code blocks:
      transferring each of the two different variants to a language-independent, abstract syntactic form to define abstracted functionally identical serial and parallel code blocks,
      storing the abstracted functionally identical serial and parallel code blocks together in a respective pattern in a semantic pattern database,
      performing a manual classification of the respective pattern according to human-selected categories or an automatic classification based on mapping to the human-selected categories, as determined based on machine learning, thereby forming a database of code block categories, and
   transferring a new code block to be investigated to the abstract syntactic form,
   comparing each new code block with the semantic pattern database of abstracted serial code blocks to identify a best fit with an existing pair of code blocks, and
   automatically selecting a category for the new code block from the human-selected categories based on the category of the identified best fit.

2. The method of claim 1, wherein the human-selected categories include the categories "rewrite loops", "change data structures", and "double structures".

3. The method of claim 1, wherein the mapping is determined based on machine learning using a neural network or a random forest.

4. The method of claim 1, further comprising user selection, by an end user with the selected best-matching category, at least one matching pattern for parallelization.

5. The method of claim 1, comprising:
   using graph comparison to select a best matching pattern based on a graph distance between a serial code of the pattern and the code block to be parallelized,
   aligning structural elements of the graphs, and creating a graph transformation for the graph of the best matching pattern and a corresponding parallel version, and
   applying the resulting graph transformation to the graph being investigated, and thereby generating a matching parallel version.

6. A system for parallelization of program code, the system comprising:
   a processor programmed to analyze source code that is present both in a serial variant and in a parallel variant that define two different variants of the source code, and identify pairs of code blocks that provide functionally identical results but come from the two different variants,
   then, for each identified pair of code blocks:
      to transfer each of the two different variants to a language-independent, abstract syntactic form to define abstracted functionally identical serial and parallel code blocks,
      to store the abstracted functionally identical serial and parallel code blocks together in a respective pattern in a semantic pattern database,
      to perform a manual classification of the respective pattern according to human-selected categories or an automatic classification based on mapping to the human-selected categories, as determined based on machine learning, and
      to transfer a respective new code block to be investigated to the abstract syntactic form,
   to compare each respective new code block with the abstracted serial code blocks of all patterns in the semantic pattern database, and
   to automatically select a category that best matches the new code block from the human-selected categories.

7. The system of claim 6, wherein the human-selected categories include the categories "rewrite loops", "change data structures", and "double structures".

8. The system of claim 6, wherein the mapping is determined based on machine learning using a neural network or a random forest.

9. The system of claim 6, wherein the processor is further programmed to:
   perform a graph comparison to select a best matching pattern based on a graph distance between a serial code of the pattern and the code block to be parallelized,
   align structural elements of the graphs, and create a graph transformation for the graph of the best matching pattern and a corresponding parallel version, and
   apply the resulting graph transformation to the graph being investigated, and thereby generate a matching parallel version.

* * * * *